Nov. 8, 1927.

A. ROHRBACH

AIRCRAFT FITTED WITH HEADLAMPS

Filed Oct. 23, 1926 2 Sheets-Sheet 1

Inventor-
Adolf Rohrbach
atty
Chas. N. Keel

Nov. 8, 1927.  A. ROHRBACH  1,648,463
AIRCRAFT FITTED WITH HEADLAMPS
Filed Oct. 23, 1926   2 Sheets-Sheet 2
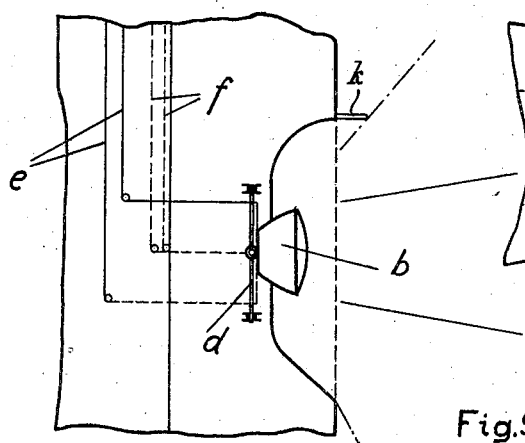
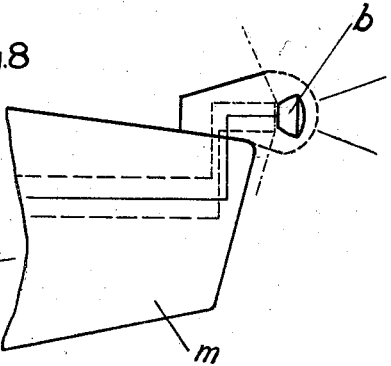
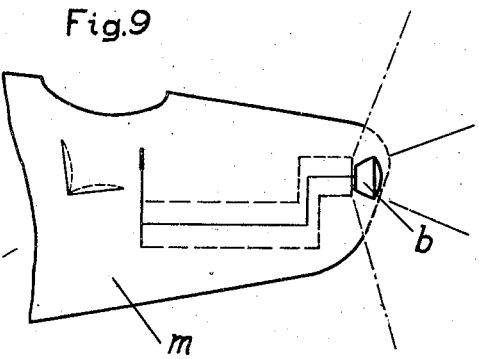
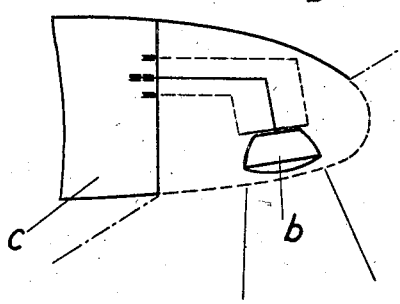
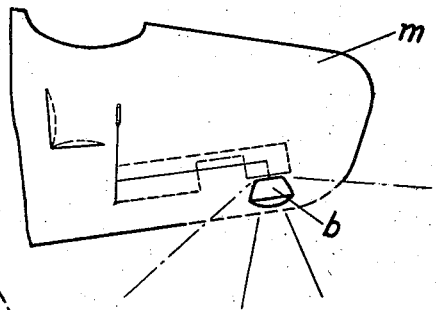
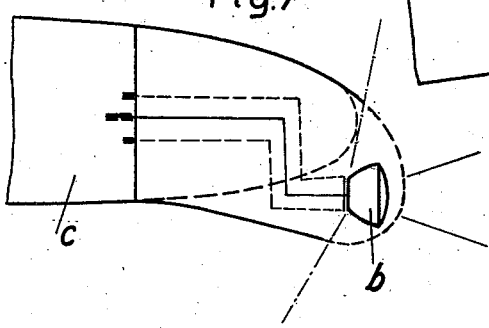
Inventor
Adolf Rohrbach
atty
Chas. N. Keel.

Patented Nov. 8, 1927.

1,648,463

UNITED STATES PATENT OFFICE.

ADOLF ROHRBACH, OF BERLIN-WILMERSDORF, GERMANY.

AIRCRAFT FITTED WITH HEADLAMPS.

Application filed October 23, 1926, Serial No. 143,615, and in Germany October 30, 1925.

The invention relates to aircraft.

The object of the invention generally is an aircraft provided with one or more search-lights or head-lamps which by means of distance control can be pivotally moved about both a vertical and a horizontal axis and the light beam or beams therefrom may be projected into the open space surrounding the path of the airplane or aircraft in any direction at the will of the pilot. A further object of the invention is to so mount the lamps on and incorporate them into the craft and to so confine and control the rays or light beams with reference to the engine and propellers that the rays do not pass through the circles of revolution of the propellers, notwithstanding the adjustment and traveling of the beams during flight, as for example by so incorporating the lamps in the craft and devising the controls, or by providing a projecting wall between the lamp or lamps and the propeller that either the latter is out of the range of the movable and traveling beam, or the projecting wall is interposed to screen and intercept the light traveling towards the propeller before its entrance into the circle of revolution thereof. The search-lamps may be disposed a considerable distance from the propellers and laterally of the longitudinal vertical plane of the craft so that the rays of light strike parallel or nearly parallel to the propeller plane, and also by such disposition of the lamps the impairment of vision by the spacial devices is minimized.

The disposition according to the present invention results in the propellers turning completely in the dark notwithstanding the traveling and movable character of the latter so that the capacity of observation by the crew is entirely unimpaired, the blinding and dazzling effects of the light passing through the propellers turning in the head light lamp being thereby entirely avoided. On the other hand, full utilization of the traveling character of the head-lamps is assured at all times with the pivoting range of the lights being in accordance with the circles of revolution of the propellers without any substantial restriction and practically the whole region about the path of the craft can be examined and explored to the fullest extent at the will of the pilot.

In contradistinction to known arrangements of lights on aircraft, therefore, the invention enables the pilot to obtain the largest possible range of lighted area by the pivoting of the lamps, it being assured at the same time that the view of the pilot is not unfavorably influenced or impaired by the reflection effect of light passing through the propeller-revolving area or otherwise and moreover the lamps are incorporated in the craft in a particularly desirable and effective manner.

Several embodiments of the subject matter of the present invention are shown, by way of example, on the accompanying drawings, wherein:

Figs. 3, 4 and 5 represent, on a still larger scale, head-lamps incorporated in the leading-edge of a wing, in front elevation, transverse section and plan view.

Figs. 6 to 10 indicate other methods of arranging or installing head-lamps on aircraft.

Figure 1:
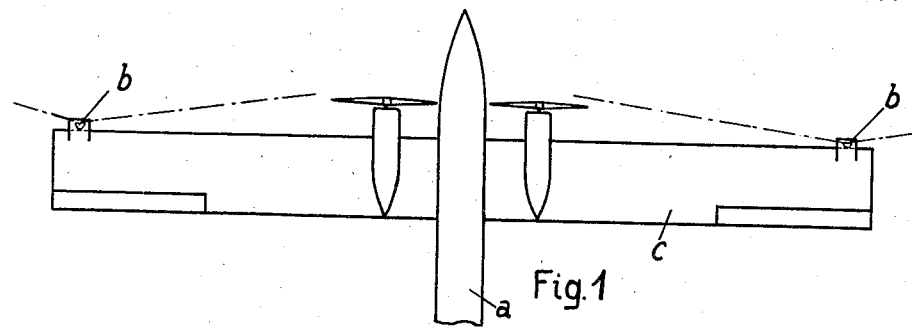
Fig. 1 represents, in plan view, the central section of an aircraft, fitted with two head-lamps.

According to Fig. 1 a twin-engined airplane $a$ is provided with two protruding head-lamps $b$ arranged in close proximity to the free wing-tips.

Figure 2:
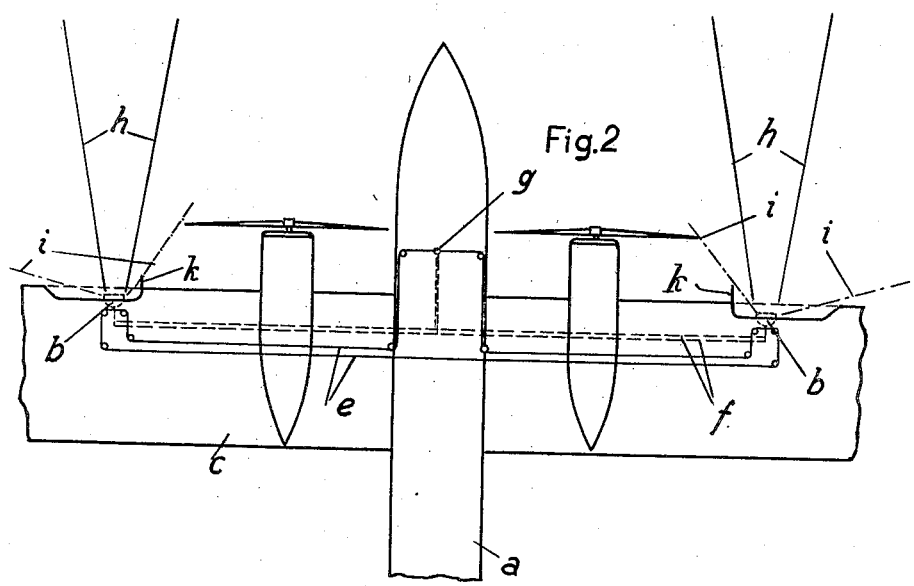
Fig. 2 shows, on a larger scale and in plan view, a second airplane.

Fig. 2 shows said headlamps $b$ to be arranged at the leading-edge of the wing $c$, laterally of and in close proximity to the engine nacelle.

The head-lamps can so be pivoted or rotated that their cone of light may be thrown either straight ahead in the path of light, or upward, downward or sideways, according to circumstances, being independent of the position of the craft and any controlling-manœuvres of her crew.

Figure 3:
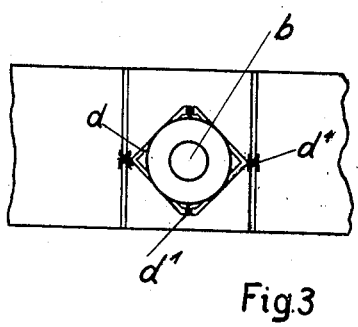
Figure 4:
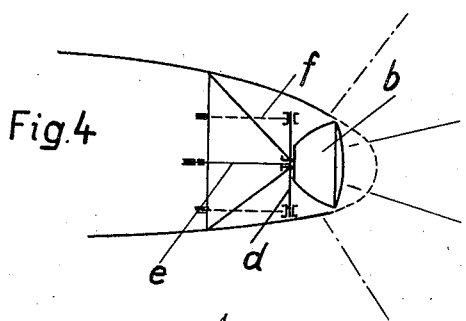

The said pivoting is made possible, as shown in Figs. 3 to 5, by the head-lamp $b$ being suspended in an universal joint $d$, from which transmitting means $e$, $f$ lead to a controlling device $g$ in the pilot's cockpit, for, instance, a special control-stick.

According to Fig. 2 the head-lamps are coupled by means of the control cables $e$, $f$, passing over suitable pulleys so as to move together. By means of the cable system $e$ they are pivotable and movable in a horizontal plane and by means of the system $f$ in vertical planes.

Combining aforesaid movements the cones of light proceeding from the head-lamps and being marked on the drawings by drawn lines $h$, are able to sufficiently light up the conical region marked by dotted lines $i$.

Care should be taken, that, with any occurring position of the head-lamps, the rays of light do never interfere with the propeller circles. This is attained by using a diaphragm $k$ (Figs. 2 and 5) or by arranging the head lamps at the wing-tip (Fig. 1). When the head lamps are arranged near the wing tips, the rays of light will pass the plane of revolution of the propellers at such a flat angle, that the pilot is not disturbed by the reflection effect. In some cases the disposition of the head lamps near the wing tips is applied in conjunction with a wall; this arrangement offers the further advantage that the range of light of the head lamps is particularly large towards the propeller side.

The range of rotation of the head-lamps should be chosen according to requirements or in accordance with the conditions prevailing at the point of attachment or incorporation into the craft structure.

The ideal full pivoting upon one fixed point cannot, in the free atmosphere, be turned to full account, since the airplane or the supporting-members of the head-lamps produce shadows, when the plane takes a certain position.

The full pivoting upon one fixed point can, for instance, be easily obtained by electrically driving the axis of rotation $d^1$ of the universal joint. After all, the pivoting of the head-lamps can be effected except by the aforesaid mechanical and electrical means, by fluids, compressed air and the like.

The head-lamps should preferably be either independent streamlined members attached to some section of the aircraft, or so incorporated in compartments of the craft with streamlined covering, that the foresection of said covering, marked in the figures by dotted lines, consist of a very transparent material.

Fig. 6 shows a head-lamp incorporated in a wing $c$ and especially suited for casting its rays forward and downward.

Fig. 7 represents a head-lamp $b$, being arranged at the bottomside of one wing and sending a centrally working light in the direction of flight.

Fig. 8 represents a head-lamp $b$ arranged at the end-section (bow or stern) of an aircraft fuselage, hull or float.

Figs. 9 and 10 show a head-lamp arranged in the fore-part of an aircraft fuselage $m$. The head-lamps can as well be incorporated in the rear-part of the fuselage.

In case of requirement, diaphragms can be provided to protect the light of the head-lamps, or those be arranged as revolving lights.

The head-lamp control need not necessarily be actioned from the pilot's cockpit.

Arrangements could be made for the head-lamp control to be occasionally coupled with the aircraft controlling-devices.

Any convenient number of head-lamps might be installed, which can be controlled either separately or jointly.

Having now particularly described and ascertained the nature of my said invention and in what manner the same is to be performed, I declare that what I claim is:

1. In an aircraft the combination of a search lamp mounted for pivotal and universal movement so as to project its beam anywhere into a region bounded by a conical-shaped section, said head lamp being arranged aft of the propeller or propellers so that its rays of light intercept the plane of the circle of revolution of the propeller, means for preventing the light passing through the circle of revolution of the propeller and remote control devices together with intermediate connections for actuating said search lamp and causing the beam thereof to travel from one position to another within said conical-shaped section.

2. An aircraft of the character set forth in claim 1 wherein the means for preventing the light passing through the circle of revolution of the propeller consists of a wall arranged between the head lamp and the propeller which intercepts the light traveling towards the propeller before it enters the circle of revolution of the latter.

3. An aircraft of the character set forth in claim 1 wherein the craft is of the heavier-than-air type and the head lamp is disposed a considerable distance away from the propeller towards a lift wing tip so that in the innermost position of the beam the rays pass in a direction substantially parallel to the propeller plane and do not substantially intercept the plane of revolution of the propellers, thereby preventing any impairment of the vision of the pilot by the reflection of the rays from the propeller blades.

4. An aircraft of the character set forth in claim 1, wherein the lamp is incorporated as a structural part which is of stream-line form, the lamp being protected by means of transparent coverings in the direction of the projecting rays, said coverings merging into the coverings of the structural part to form therewith a stream-line effect.

5. An aircraft of the character set forth in claim 1, wherein the lamp is connected with a controlling device of the character of an airplane control stick.

6. In an airplane the combination of a pair of search lamps, each of which is pivotally mounted about its support for universal adjustments so as to project beams into a region bounded by a conical-shaped section, each of said head lamps being so arranged aft of the propellers that its rays of light pass through the plane of the circle of revolution of the propeller in certain positions of the lamp, means for preventing the light passing through the circle of revolution of the propeller and means coupling said search lamps together for movement in unison together with remote control means for moving the lamps in unison.

7. In an airplane the combination of a pair of search lamps pivotally supported thereon for universal movement about their supports, means coupling said lamps together for operation and movement in unison and remote control means for actuating said lamps in unison to cause their respective beams to be projected in the desired directions.

8. In an airplane a search lamp pivotally supported within a structural stream-line part thereof for universal movement about its support, a transparent stream-line covering for said structural part co-extensive with the cone of movement of said pivoted lamp and merging into the stream-line covering of the structural part and a remote control together with operating connections leading to said pivoted lamp for moving said lamp to any position desired by the operator.

9. An aircraft of the character set forth in claim 1 wherein the lamp is incorporated adjacent the leading edge of the supporting wing, together with suitable transparent stream-line coverings therefor merging into the wing contour.

10. An aircraft of the character set forth in claim 1 wherein the lamp is mounted adjacent one end of a fuselage or main body, together with the provision of transparent stream-line covering merging with the covering of the fuselage or main body.

In testimony whereof, I have signed my name to this specification.

DR. ADOLF ROHRBACH.